United States Patent [19]

Kamimura et al.

[11] Patent Number: 5,107,946
[45] Date of Patent: Apr. 28, 1992

[54] STEERING CONTROL SYSTEM FOR MOVING VEHICLE

[75] Inventors: Kenji Kamimura; Sadachika Tsuzuki; Kazunori Noda; Shuzo Fujimoto; Toru Takeda, all of Saitama, Japan

[73] Assignee: Honda Giken Kogyo Kabushiki Kaisha, Tokyo, Japan

[21] Appl. No.: 553,625

[22] Filed: Jul. 18, 1990

[30] Foreign Application Priority Data

Jul. 26, 1989 [JP] Japan .................... 1-193212
Aug. 14, 1989 [JP] Japan .................... 1-207860

[51] Int. Cl.$^5$ .................................................. B62D 1/24
[52] U.S. Cl. ........................................ 180/169; 180/167; 318/587; 364/424.02
[58] Field of Search ............... 180/167, 169; 318/587; 340/988, 989; 356/375; 364/424.02, 432

[56] References Cited

U.S. PATENT DOCUMENTS

| 4,413,210 | 11/1983 | Gronau | 180/169 X |
| 4,537,271 | 8/1985 | Ito et al. | 180/169 X |
| 4,802,096 | 1/1989 | Hainsworth et al. | 318/587 X |
| 4,809,178 | 2/1989 | Ninomiya et al. | 318/587 X |
| 4,939,650 | 7/1990 | Nishikawa | 364/424.02 |
| 4,947,324 | 8/1990 | Kamimura et al. | 180/169 X |
| 4,994,970 | 2/1991 | Noji et al. | 180/169 X |
| 5,011,288 | 4/1991 | Noji et al. | 180/169 X |

FOREIGN PATENT DOCUMENTS 0182711  7/1988  Japan .................... 180/169

Primary Examiner—Andres Kashnikow
Assistant Examiner—Brian L. Johnson
Attorney, Agent, or Firm—Pollock, Vande Sande & Priddy

[57] ABSTRACT

A steering control system for a moving vehicle causes the vehicle to travel along a predetermined traveling course in a region in which a predetermined working operation, such as grass cutting or the like, is to be performed by the vehicle as it moves along the traveling course. An obstacle sensor is mounted on the vehicle, and when the sensor detects presence of an obstacle on the predetermined traveling course, the steering control system operates to cause the vehicle to leave the predetermined traveling course and to detour around the obstacle while maintaining a substantially constant distance between the obstacle and the moving vehicle. The control system is also operative to determine whether the obstacle is stationary or movable and, upon completion of the vehicle travel along the predetermined course, is operative to determine whether a movable obstacle has been removed from the predetermined course and, if so, causes the vehicle to perform its working operation in that portion of the region in which the working operation was not previously performed due to its detour around the obstacle.

9 Claims, 11 Drawing Sheets

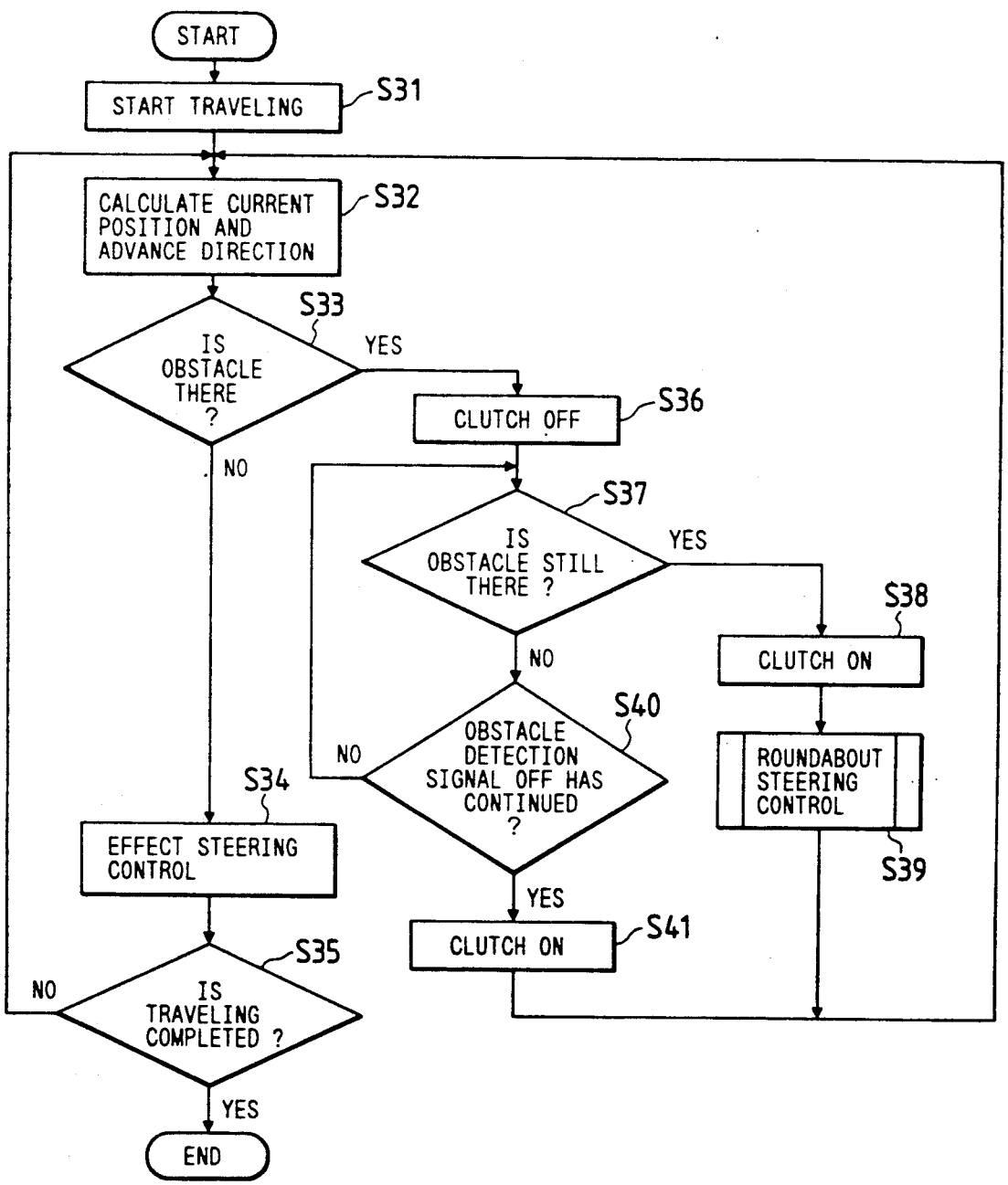

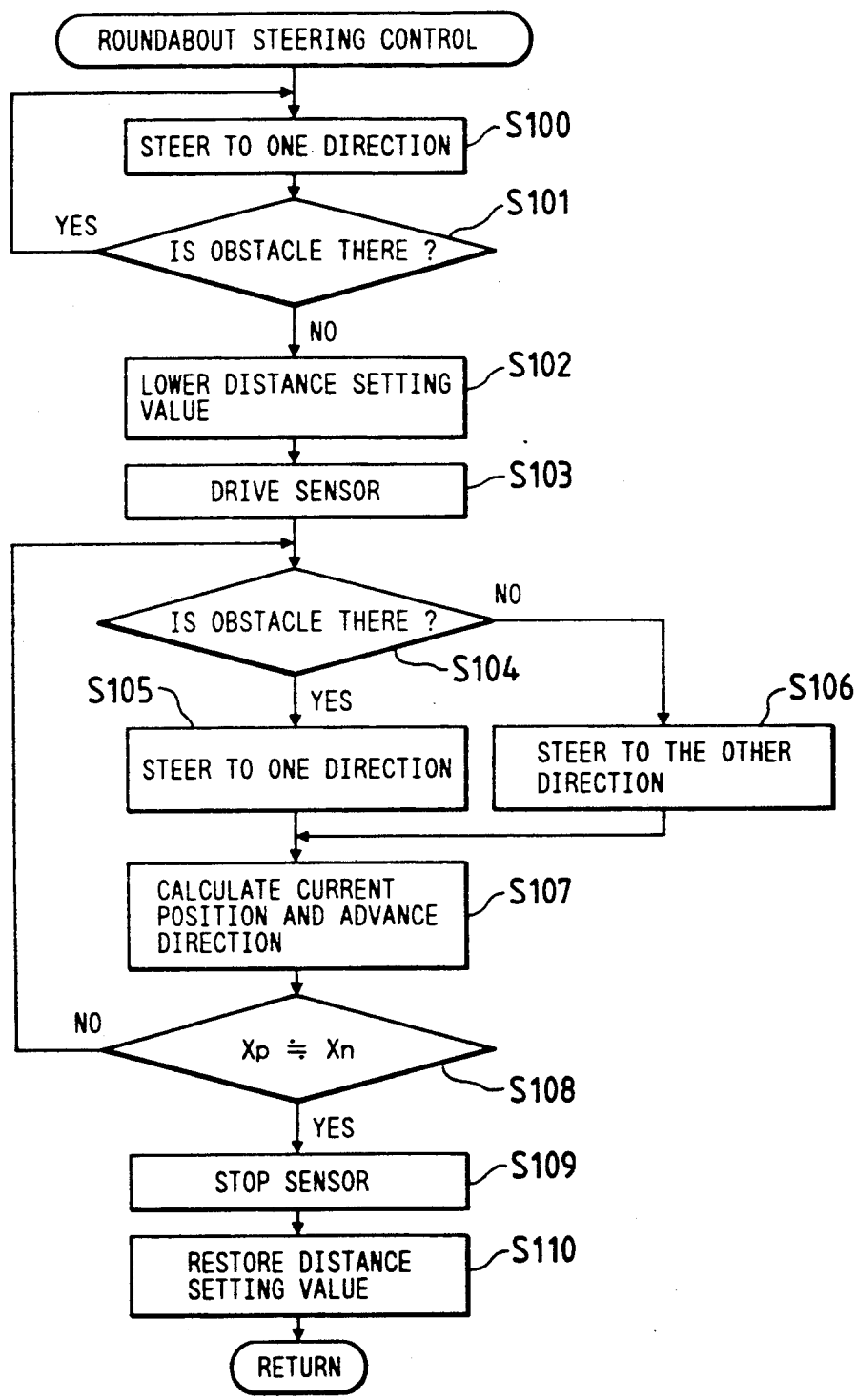

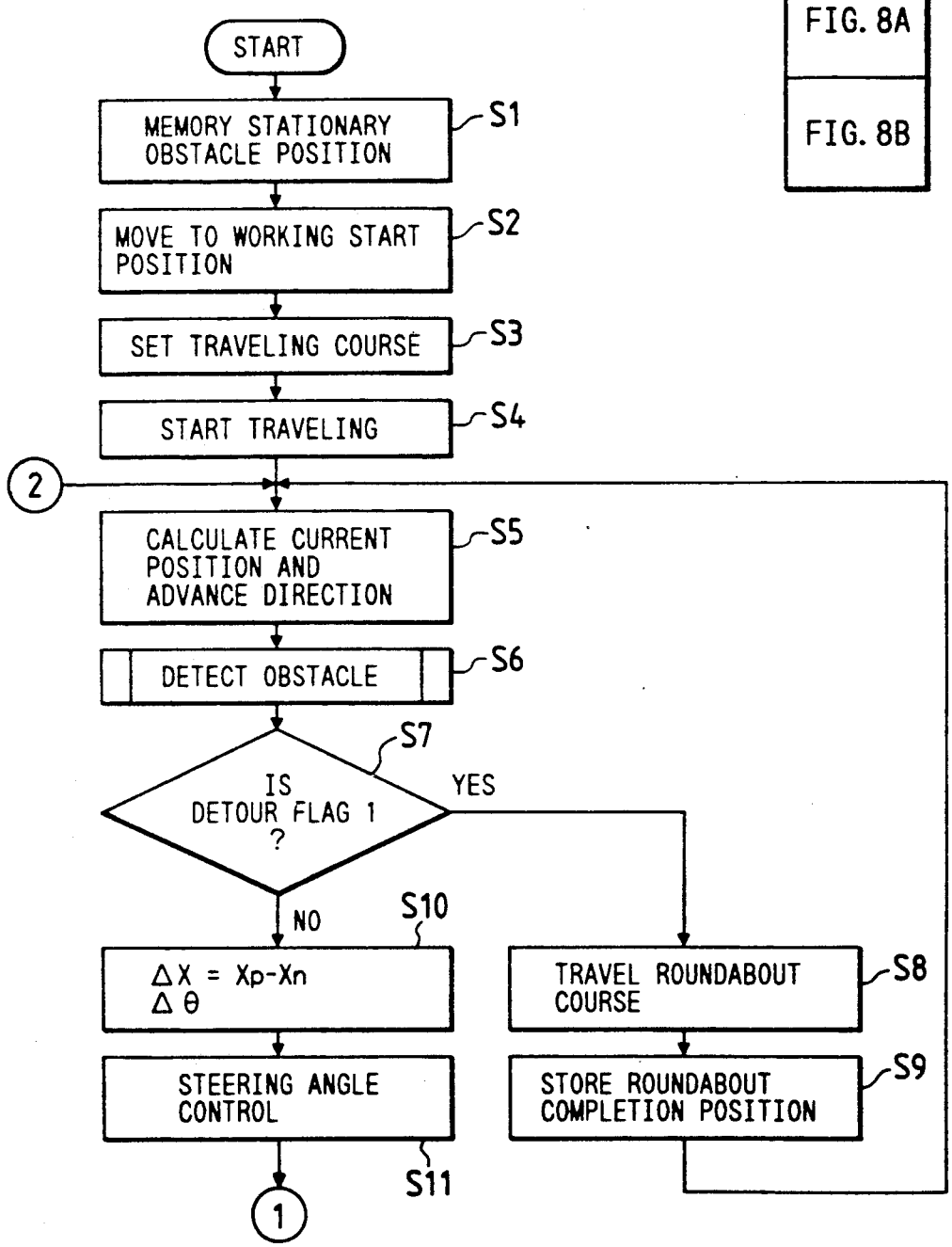

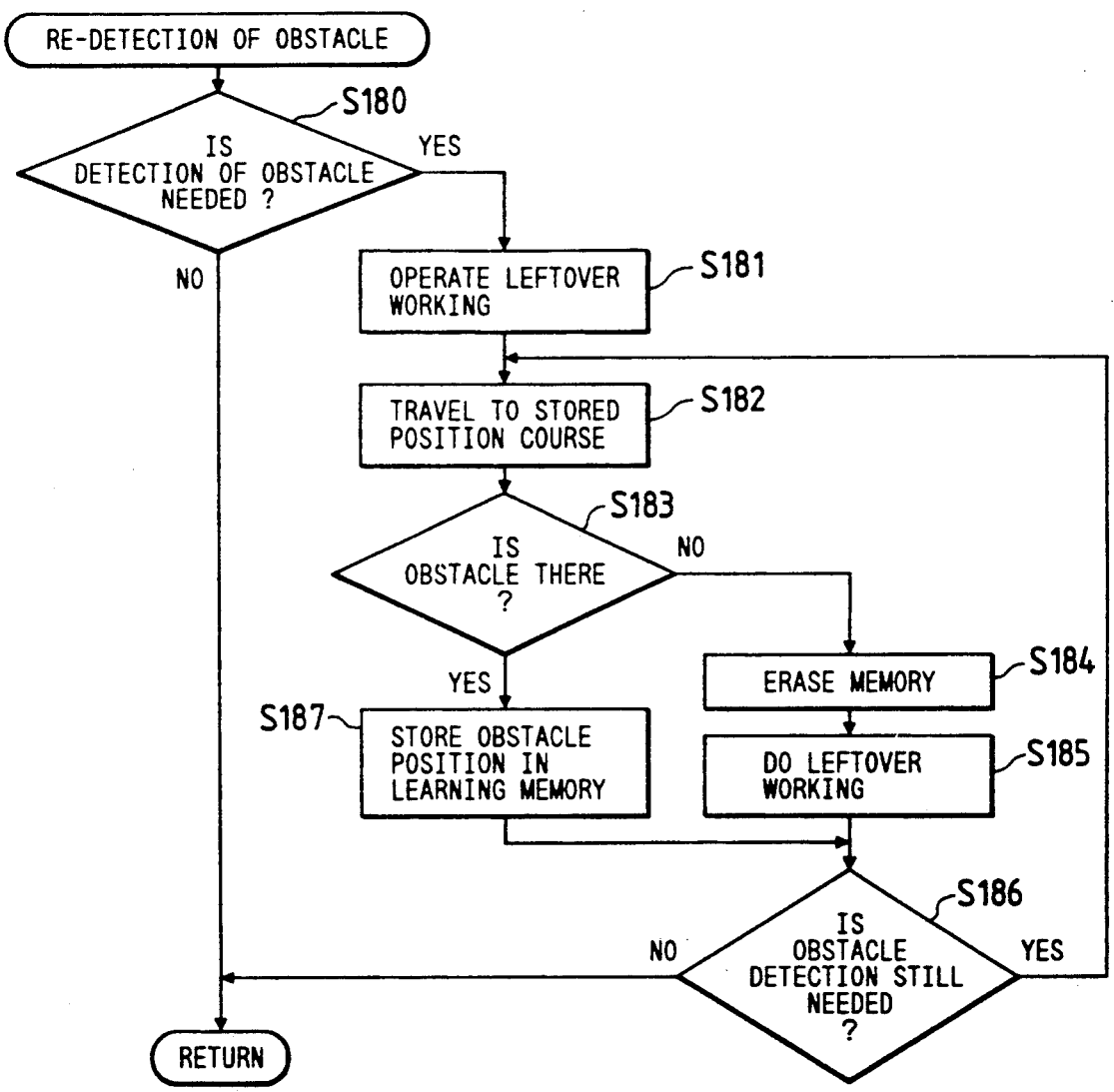

5,107,946

STEERING CONTROL SYSTEM FOR MOVING VEHICLE

BACKGROUND OF THE INVENTION

1. Field of the Invention

The present invention relates to a steering control system for causing a moving vehicle such as an automobile, a driverless mobile and carrying device in a factory, or a vehicle used in agriculture, civil engineering machinery and the like, to travel along a preset course, and is more particularly concerned with a steering control system for causing such a moving vehicle to detour around obstacles on the traveling course thereof.

2. Description of the Prior Art

As an example of a conventional control means for steering a moving vehicle as described above along a predetermined course to carry out desired work operations such as grass clipping, transporting and the like, there is a system which includes means for detecting a present position and an advance direction of the vehicle with respect to reference points disposed at at least three positions in and around a work zone, and the traveling direction of the moving vehicle is controlled on the basis of the positional information obtained from the detecting means.

Moreover, as another example of a steering control system, there is a system wherein electromagnetic cables, magnetic tapes or light beam reflecting tapes or the like are disposed along a predetermined course in a work zone, and the direction of a moving vehicle is controlled by detecting the position of the moving vehicle relative to these cables, tapes or the like.

There are also some moving vehicles that include a sensor for detecting whether and where an obstacle or obstacles are present on the predetermined traveling course, and means are provided for detouring the vehicle around the obstacle and along a prescribed detouring pattern when any obstacle is detected. However the steering control in these systems is effected in accordance with a detouring pattern calculated in response to the position of an obstacle, or the vehicle is detoured around the obstacle along a predetermined detouring pattern, and these systems therefore suffer from the disadvantage that the moving vehicle cannot correctly return to the predetermined traveling course after the detouring operation if the moving vehicle gets out of position due to slip and the like of its wheels during the detouring operation.

In an effort to solve the problem described above, Japanese Patent Laid-open No. 47606/1985 discloses an automatically traveling working vehicle (moving vehicle) which comprises an azimuth sensor for detecting deviation in the direction of the vehicle body with respect to a prescribed reference azimuth, and a control means is provided for causing the direction of the vehicle body to coincide with the reference azimuth on the basis of the azimuth detected by the azimuth sensor during travel of the vehicle along a straight portion of a predetermined detouring pattern. This arrangement has, however, given rise to other problems. While deviation of the vehicle from the predetermined course due to slip and the like of its wheels can be corrected during the detouring operation, the correction is based on a predetermined sequence so that the detouring patterns are restricted. Accordingly, the moving vehicle cannot necessarily accomplish the detouring operation in an efficient manner by passing through the shortest course with respect to obstacles which have various dimensions. In addition the area where the moving vehicle has gone around an obstacle is left as an unfinished working place. In order to complete the desired working operation on such a leftover zone, either the obstacle was removed and then the moving vehicle was transferred back to the position where the obstacle had been present by manual control, radio control or the like so that the vehicle could resume the prescribed working operation, or the prescribed working operation was completed manually on the unfinished working place. Since the automatic operation was frequently interrupted by such manual operations, expected advantages were not obtained in spite of the intention that a moving vehicle be used to attain energy saving and to elevate working efficiency.

Furthermore, while it has been arranged in the above described moving vehicle that the direction of the vehicle body is adjusted to its reference azimuth in a straight portion of its traveling route along a detour, no such countermeasure is provided when a positional deviation appears while the vehicle is following an oblique travel course.

SUMMARY OF THE INVENTION

An object of the present invention is to provide a steering control means for a moving vehicle which can positively effect a detour around obstacles having various dimensions without being affected by a deviation in the position of the vehicle due to slip of its wheels and the like.

To achieve the above object, and in accordance with the present invention, when an obstacle is detected by means of a sensor installed on the moving vehicle, the moving vehicle is allowed to go around the circumference of the obstacle while maintaining a prescribed distance between the moving vehicle and the obstacle, and it is adapted to continue the roundabout travel until the moving vehicle returns to a predetermined traveling course.

In accordance with the present invention, a roundabout course for detouring around an obstacle is not previously set; instead, since the moving vehicle is allowed to transfer while maintaining a prescribed distance between the moving vehicle and such an obstacle, the moving vehicle can detour around such an obstacle by passing through an efficient and the shortest course determined by the dimensions and shape of the obstacle. Furthermore, since the distance between an obstacle and the moving vehicle is used as a control reference, a detouring operation can positively be carried out without depending upon factors such as the slip of the vehicle wheels and the like.

Another object of the present invention is to provide a steering control means for a moving vehicle which makes it possible for the moving vehicle to automatically carry out a desired work operation in an unfinished or leftover work zone.

To achieve the above object, the control system of the present invention includes a memory means which stores the position of an obstacle detected by means of a sensor, a means for transferring the moving vehicle to said stored position after the moving vehicle has detoured around the obstacle and completed the intended work operation, and a means for detecting whether or not the obstacle has been removed from the stored position so that the moving vehicle can do a leftover working operation, at the place where the obstacle had previously been present, after the obstacle has been removed.

Thus, in accordance with the present invention, it is judged afresh whether or not a leftover working operation may be carried out in an unfinished working place after a usual working operation is completed which leaves such an unfinished working place where the obstacle had been present, whereby it is possible to allow the moving vehicle to do the leftover working operation in such an unfinished working place.

Furthermore, the control system of the present invention includes a means for storing the position of a specified stationary obstacle, and a means for judging whether or not an obstacle which was detected and detoured around during the desired working operation is the stationary obstacle which has been stored in the memory means. The moving vehicle is allowed to return to the position where the obstacle had previously been present after completing the usual working operation, and a determination whether or not the obstacle has been removed is effected in only the case when the obstacle which was detoured around by the moving vehicle during the usual working operation is not a stationary obstacle.

Thus, in accordance with the present invention, it may be judged whether or not a leftover working operation can be carried out with respect to an unfinished working place by only identifying the stored positional information of a stationary obstacle which was detected by a sensor, so that there is no need to judge whether or not a leftover working operation can be carried out by transferring the moving vehicle to the position where an obstacle had been detected after completing the usual working operation. Accordingly, it is sufficient to merely perform the minimal required operation by the moving vehicle in order to complete a leftover working in an unfinished working place, so that the working efficiency is further improved.

BRIEF DESCRIPTION OF THE DRAWINGS

FIGS. 3 and 4 are flowcharts for steering control each illustrating the operation of the first embodiment;

FIGS. 8, 8A, 8B, 9, 10 and 11 are flowcharts illustrating the operation of the second embodiment.

DETAILED DESCRIPTION OF THE PREFERRED EMBODIMENTS

Figure 6:
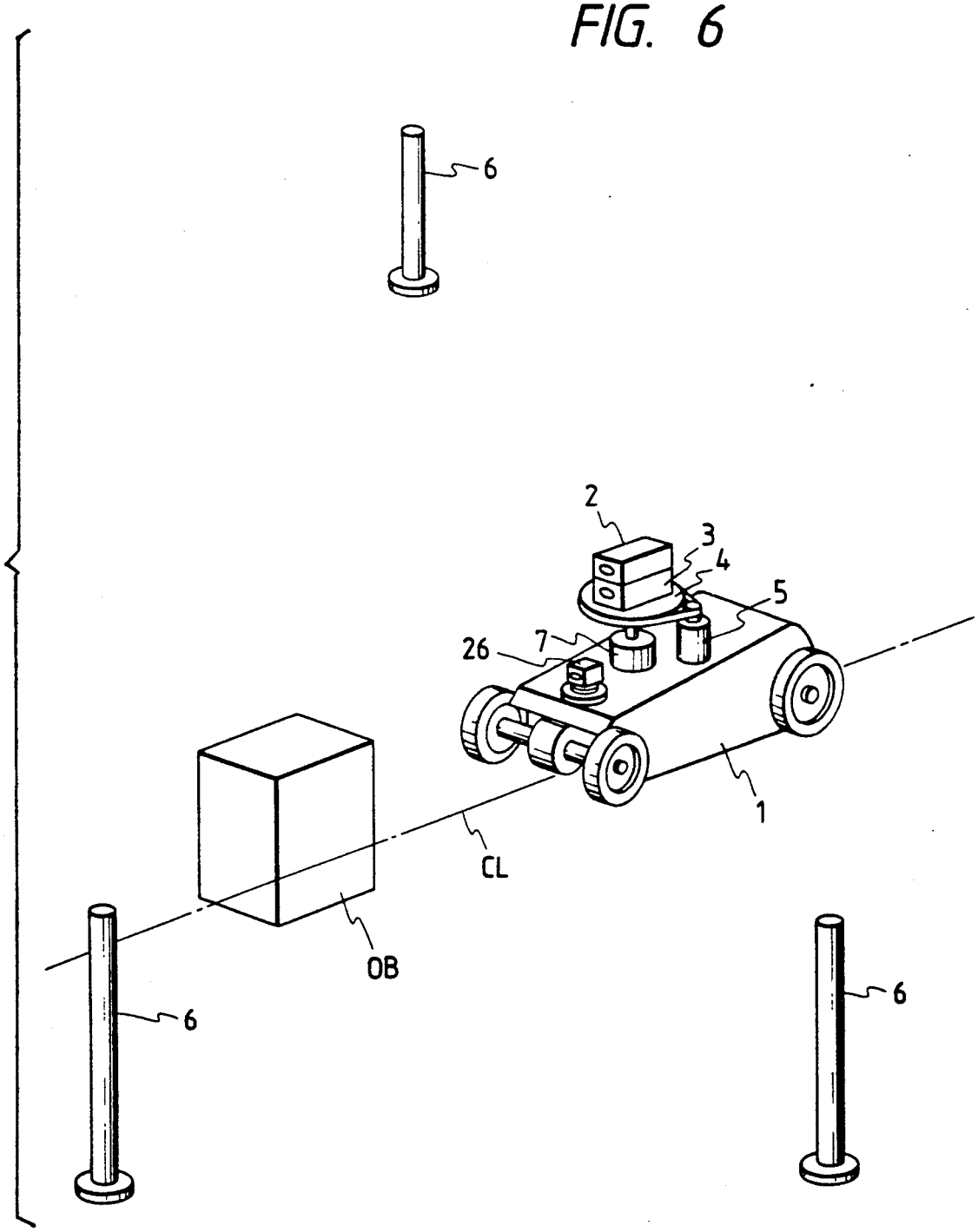
FIG. 6 is a perspective view showing a positional relationship among a moving vehicle, reflectors and an obstacle, respectively.

The first embodiment of the present invention will be described hereinbelow by referring to the accompanying drawings. FIG. 6 is a perspective view showing a moving vehicle in which the control system according to the present invention is installed, and the layout of beam reflectors disposed in a traveling region for the moving vehicle.

In FIG. 6, the moving vehicle 1 is, for example, a moving vehicle for use in an agricultural working operation, e.g., a lawn mower or the like, which is automatically controlled so as to travel along a course CL which has been previously set. A rotating table 4 driven by a motor 5 is mounted on the upper part of the moving vehicle 1. A beam source 2 for emitting a light beam and a beam receiver 3 for receiving a reflected light beam are installed in the rotating table 4. The beam source 2 includes a light emitting diode (not shown), and the beam receiver 3 involves a photodiode (not shown) for receiving an incident light beam to convert it into an electrical signal. A rotary encoder 7 is provided with a linkage to a driving shaft of the rotating table 4, and pulses output from the rotary encoder 7 are counted, whereby a turning angle of the rotating table 4 can be detected.

Reflectors 6 are disposed at reference points on the circumference enclosing a working area of the moving vehicle 1. Each reflector 6 has retroreflective surfaces which reflect incident light in the incident direction, and a so-called corner cubed prism which is commercially available may be used as the reflector.

An ultrasonic sensor 26 is mounted on the front part of the moving vehicle; the ultrasonic sensor detects an obstacle OB on the course CL of the moving vehicle 1 and the resulting detection signal is supplied to a steering control system of the moving vehicle 1. The ultrasonic sensor 26 can detect obstacles existing in a predetermined range spreading in front of the moving vehicle 1. In roundabout travel, the ultrasonic sensor 26 detects the distance between the moving vehicle 1 and an obstacle OB, and the ultrasonic sensor 26 is rotatable in such a manner that the moving vehicle can detour around the obstacle OB while keeping said distance constant, if necessary.

Figure 1:
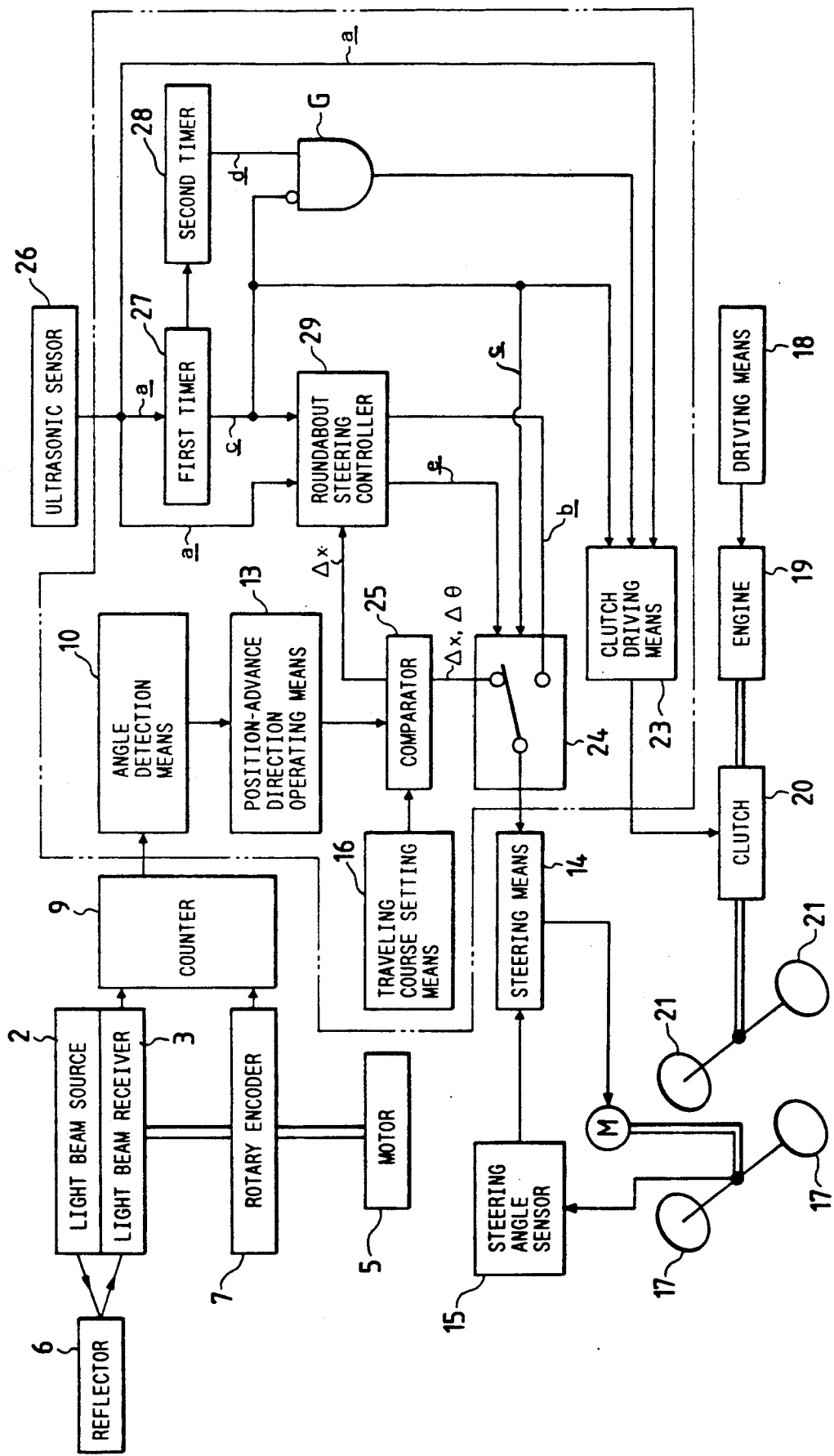
FIG. 1 is a block diagram illustrating a first embodiment of the present invention.

An embodiment of the control system of the present embodiment will be described in conjunction with the block diagram of FIG. 1. In FIG. 1, the light beam emitted from the beam source 2 is scanned in a rotating direction of the rotating table 4, and it is reflected by the reflectors 6. The light beam reflected by a reflector 6 is input to the beam receiver 3, and it is used to generate information indicating the azimuth of the reflector 6 with respect to the advance direction of the moving vehicle. In a counter 9, the number of pulses output from the rotary encoder 7 during rotation of the rotating table 4 is counted. The count value of the pulses is transferred to an angle detection means 10 upon every reception of the reflected light beam in the beam receiver 3. In the angle detection means 10, the azimuth of each reflector 6 with respect to the advance direction of the moving vehicle 1 is calculated on the basis of the count value of the pulses transferred upon every reception of a reflected light beam.

In a position-advance direction operating means 13, a current position coordinate of the moving vehicle 1, in an x-y coordinate system wherein a straight line extending between two of three reference points is the x-axis as well as the advance direction of the moving vehicle, are calculated on the basis of each detected angle defined between two adjoining reflectors among the respective reflectors 6, that is, said three reference points viewed from the moving vehicle 1, i.e., a differential azimuth. The x-y coordinate system is set based on positional information which is obtained by previously measuring the positions of the respective reference points. The specific calculation procedure and the calculation formula for the above described coordinate and advance direction determinations are fully described in applicants, copending U.S. patent application Ser. No. 07/344,574, now U.S. Pat. No. 5,011,288.

The results calculated in the position-advance direction operating means 13 are input to a comparing means 25. In the comparing means 25, data indicating the traveling course previously set in a traveling course setting means 16 are compared with the coordinate and advance direction of the moving vehicle 1 obtained in the position-advance direction operating means 13, so that a positional difference $\Delta x$ of the moving vehicle 1 and an angle difference $\Delta \theta$ of the advance direction with respect to the traveling course are detected. The positional difference $\Delta x$ and the angle difference $\Delta \theta$ of the advance direction are input to a steering means 14 through a switching means 24, and in the steering means 14 the steering angle for the front wheels 17 of the moving vehicle 1 is determined on the basis of these data.

On the basis of the steering angle so determined, a steering motor M connected to the front wheels 17 of the moving vehicle is driven. The steering angle of the front wheels 17 is detected by a steering angle sensor 15 mounted on the front wheels of the moving vehicle 1, and the result detected is fed back to the steering means 14. A driving means 18 controls the start and stop of an engine 19 (see U.S. patent application Ser. No. 07/362,630, now U.S. Pat. No. 4,947,324, as to the details of the above described steering control).

An obstacle detection signal a derived from the ultrasonic sensor 26 is input to a first timer means 27, a clutch driving means 23 and a roundabout steering control means 29, respectively.

A period of time for outputting the detection signal a is measured in the first timer means 27, and when the signal is continuously output for a predetermined period of time, an obstacle confirming signal c is output to the clutch driving means 23, a switch means 24 and the roundabout steering control means 29 respectively. The clutch driving means 23 outputs a clutch disengaging (OFF) signal for a clutch 20 in response to the signal a, while a clutch engaging (ON) signal for the clutch 20 is output in response to the signal c with respect to the clutch 20.

After supplying the signal c, the roundabout steering control means 29 responds to ON-OFF of the detection signal a from the ultrasonic sensor 26 to supply a steering signal b for avoiding the obstacle OB, to the steering means 14 through the switching means 24.

When the detection signal a turns to OFF before elapse of the predetermined period of time being measured by the first timer 27, the first timer means 27 is reset, and at the same time, a second timer means 28 commences measurement of the time. When it is confirmed by the second timer means 28 that an OFF state of the detection signal a continued over the predetermined period of time, a signal d is output from the second timer means 28. The signal d is supplied to the clutch driving means 23 via a gate G which is closed during the output of signal c from the first timer means 27. The clutch driving means 23 outputs an ON signal for the clutch 20 in response to the signal d supplied through the gate G. When the detection signal a turns again to ON before elapse of the predetermined period of time being measured by means of the second timer means 28, the first timer means 27 begins again measurement of the time.

The switching mean 24 is switched to the side of the roundabout steering control means 29 by the obstacle confirming signal c. And when it is detected by a return judging means 30 (see FIG. 2) of the roundabout steering control means 29 that the moving vehicle 1 has completed its roundabout travel and returned to the predetermined traveling course, the switching means 24 is switched to the side of the comparing means 25 by means of a returning detection signal e output from the roundabout steering control means 29. Judgment on return to the traveling course CL of the moving vehicle is effected on the basis of the signal $\Delta x$ supplied from the comparing means 25 to the roundabout steering control means 29.

Among the constructional elements shown in FIG. 1, the parts enclosed by a chain line may be constituted by a microcomputer.

Next, the operation of the first embodiment according to the construction described above will be explained. FIGS. 3 and 4 are flowcharts each showing the operation of the first embodiment, and FIG. 5 is an explanatory view showing a roundabout traveling route of the moving vehicle 1.

Figure 5:
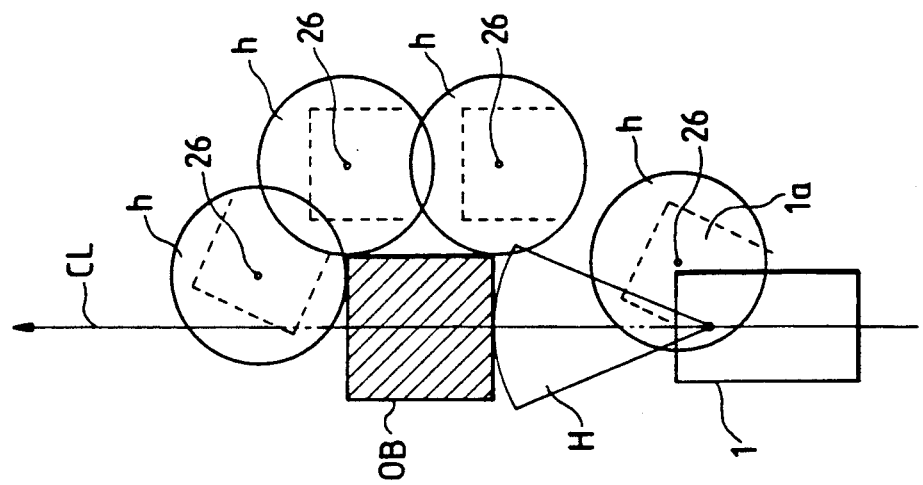
FIG. 5 is an explanatory view showing a roundabout traveling route of a moving vehicle.

In FIGS. 3 and 5, the clutch 20 is engaged to commence travel of the moving vehicle 1 in step S31. When the travel of the moving vehicle 1 begins, a present position and advance direction of the moving vehicle 1 are calculated on the basis of the output from the angle detecting means 10 to the position-advance direction operating means 13 (step S32).

In step S33, it is determined whether or not an obstacle OB was detected. When the obstacle OB is present in a prescribed range H lying before the advance direction of the moving vehicle 1, the procedure shifts to step S36, while if no obstacle OB is present, it proceeds to step S34.

In step S34, based on a deviation $\Delta x$ defined between the position as well as the advance direction of the moving vehicle 1 detected in the step S32 and the traveling course CL which has been previously set, a steering angle is determined so as to correct the deviation thereby to effect steering control.

In step S35, it is judged whether or not the moving vehicle has completed travel throughout the predetermined traveling course, and control is repeated after the procedure returns to step S32 until the moving vehicle completes its travel over the whole distance.

On the other hand, when it was judged that the obstacle OB was detected, the clutch 20 is disengaged in response to the obstacle detection signal a and the travel of the moving vehicle 1 is stopped in step S36.

In step S37, it is judged whether or not the obstacle is still present on the traveling course based on the presence of the output signal c from the first timer means 27. When the detection signal a continues over a predetermined period of time (five seconds have been set in the present embodiment) and the output signal c is output from the first timer means 27, it is judged that the obstacle OB is still present on the traveling course CL and the procedure shifts to step S38.

In step S38, the clutch 20 is engaged to commence travel of the moving vehicle 1, and in step S39, roundabout steering control is effected to cause the moving vehicle 1 to go around the obstacle at a constant distance from the obstacle OB (FIG. 5).

The roundabout steering control in step S39 will be described hereinbelow in conjunction with FIG. 4.

When the obstacle detection signal a becomes OFF before the elapse of the predetermined period of time (five seconds), it is judged that the obstacle detection signal a in this case is not the one which was obtained as a result of detection of a stationary obstacle, but that such a signal was obtained as a result of tentative detection of a passing object or the like. Thus, when the detection signal a turns to the OFF state before the elapse of the predetermined period of time, the judgment in the step S37 becomes NO so that the procedure proceeds to step S40.

In the case where an OFF state of the obstacle detection signal a continues and when the signal d is output from the second timer means 28 after the elapse of a predetermined period of time (1 second has been set in the present embodiment) or more, the judgment in the step S40 becomes YES on the basis of the signal d so that the procedure proceeds to step S41.

In step S41, the clutch 20 is engaged to start again travel of the moving vehicle 1.

When the OFF state of the obstacle detection signal a is less than the prescribed period of time, the procedure returns from step S40 to step S37.

Next, the roundabout steering control in step S39 will be described herein. This steering control is carried out in accordance with a process, for example, as shown in FIG. 4.

In FIG. 4, first, a steering direction is taken in one direction, for example the right direction, in step S100.

In step S101, it is judged whether the obstacle OB has been detected or not. Until the obstacle OB is not detected, in other words until the obstacle OB is out of the detection range H (FIG. 5), the procedure in step S100 is repeated.

After the moving vehicle 1 has traveled while steering in the right direction until the obstacle OB is out of the detection range H, the procedure proceeds to step S102 to change a distance setting value for detecting an obstacle within a predetermined range by means of the ultrasonic sensor 26. More specifically, a threshold value of a distance from the sensor 26 which is for generating the signal a is lowered so as to output the detection signal a in the case where the obstacle OB was positioned in a detection range h (h<H).

The reason why the threshold value is altered for the signal a as described above is as follows. If the distance threshold value is low from the beginning, there may be a case where the moving vehicle 1 does not go around the obstacle OB while the moving vehicle advances after the obstacle OB was detected, because the presence of the obstacle OB is detected in too short a distance from the moving vehicle. On the other hand, when the moving vehicle 1 is allowed to go around the obstacle OB while such distance threshold value is set at a higher value, there is a disadvantage that the moving vehicle goes around the obstacle OB by an unnecessarily wide extent so that the unfinished region to be worked increases, and this decreases working performance. In order to eliminate these defects, it is desirable to change the distance setting value as occasion demands.

In step S103, the ultrasonic sensor 26 is allowed to turn so as to confront the obstacle OB. This is done so that the distance between the moving vehicle 1 and the obstacle OB is correctly measured to keep the distance constant so as not contact each other even if the obstacle OB is at the side of the moving vehicle 1 during the advance thereof.

In step S104, it is judged again whether the obstacle OB was detected or not. In the case where the distance between the moving vehicle 1 and the obstacle OB becomes equal to or less than the predetermined value h and the obstacle OB is still detected, the moving vehicle is further steered in the right direction in step S105. However, if the obstacle OB is not detected, in other words if the distance between the moving vehicle 1 and the obstacle OB exceeds the predetermined value, the procedure shifts to step S106 to steer the moving vehicle in the opposite or left direction.

In step S107, a position and an advance direction of the moving vehicle 1 are calculated.

It is judged in the return judging means 30 whether or not the moving vehicle 1 returned to the predetermined traveling course after it completed its roundabout travel in step S108. This judgment is effected by judging whether or not an x-direction coordinate Xn of the predetermined traveling course CL coincides with an x-direction coordinate Xp of the moving vehicle 1, in other words, whether or not a deviation $\Delta x$ of Xp with respect to Xn became "0" on the basis of the positional information of the moving vehicle 1 obtained in the preceding step S107.

Until it is judged that the moving vehicle has returned to the predetermined traveling course, the procedures in steps S104–S108 are repeated. When it is judged that the moving vehicle has returned to the predetermined traveling course, turning of the ultrasonic sensor 26 is stopped in a state where it is directed to the front of the advance direction of the moving vehicle 1.

In step S110, a detecting distance threshold value of the ultrasonic sensor 26 is restored to the original value, so that the sensor is adapted to detect an obstacle OB within an area extending over the range H.

When the procedure in step S110 is completed, the procedure returns to step S2 of the main routine (FIG. 4) and as a result, normal steering control in which the moving vehicle is allowed to travel along the traveling course CL is started again.

Figure 2:
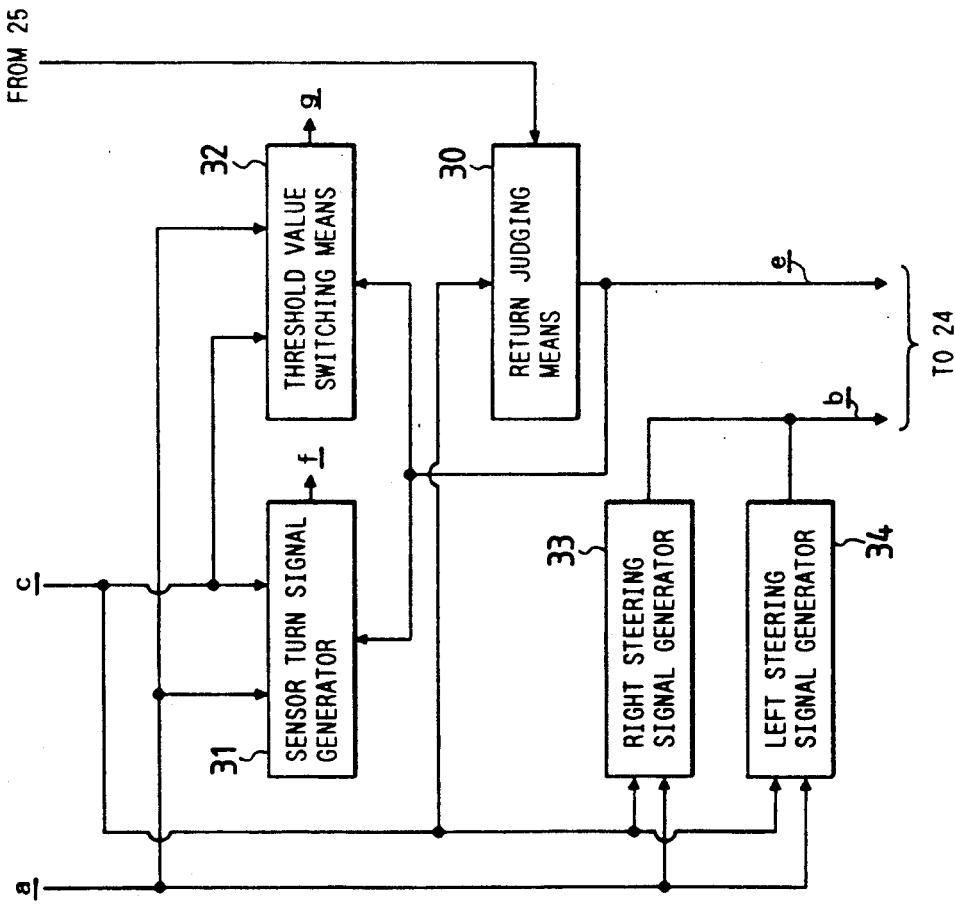
FIG. 2 is a detailed block diagram showing the roundabout steering control means of FIG. 1.

Functions of the roundabout control means 29 for effecting the operation illustrated in FIG. 4 will be described by referring to FIG. 2. In FIG. 2, a sensor turn signal generating means 31 and a threshold value switching means 32 output a turn starting signal f for turning the ultrasonic sensor 26 and a signal g for lowering a threshold value on the basis of the obstacle detection signal a and the obstacle confirmation signal c, respectively. These signals are supplied to a sensor turn driving means (not shown) and a sensitivity setting means (not shown), respectively.

A right steering signal generating means 33 outputs a steering signal for changing the advance direction of the moving vehicle 1 in the right direction, while a left steering signal generating means 34 outputs a steering signal for changing the advance direction of the moving vehicle 1 in the left direction.

The right steering signal generating mean 33 steers the moving vehicle 1 in the right direction in response to the signal c, and thereafter the means 33 continues to output a steering signal in the right direction until the signal a reaches an OFF state. After the obstacle detection signal a becomes OFF, the right steering signal generating means 33 or the left steering signal generating means 34 outputs a steering signal in the right or left direction dependent on the ON-OFF state of the signal throughout the time the first timer means 27 outputs the signal c.

Completion of the roundabout travel is judged in the return judging means 30. The return judging means 30 outputs the return detection signal e to the switching means 24 when the obstacle confirmation signal c is supplied to the return judging means 30 and a positional deviation $\Delta x$ of the moving vehicle 1 input from the comparing means 25 is "0". When the return detection signal e is inputted to the sensor turn signal generating means 31 and the sensitivity switching means 32, the ultrasonic sensor 26 is stopped at a position where it is directed in a predetermined direction (toward the front of the moving vehicle 1), and the distance threshold value is restored to the original set value H.

As described above, in accordance with the first embodiment, when an obstacle OB is detected on the traveling course, the roundabout travel is effected on the premise that the obstacle OB is present over the predetermined period of time. In this roundabout travel, the moving vehicle 1 can travel around the obstacle while maintaining a constant distance with respect to the obstacle OB by controlling steering in the right or left direction based on the ON-OFF state of the detection signal a.

In the first embodiment, while the distance threshold value of the ultrasonic sensor 26 is switched and the sensor 26 is turned to confront the obstacle OB in the course of the detouring operation, such switching is not necessarily required in a case where the roundabout route is allowed to become somewhat longer and substantially no trouble arises from the practical point of view. It may also be possible that after an obstacle OB is detected, an angle range in which the obstacle OB can be detected is set within a necessary range extending from the side to the rear of the moving vehicle 1 and the ultrasonic sensor 26 is swung in said angle range.

If the system is so constructed that a sensor for detecting an obstacle OB during travel on a predetermined traveling course is provided separately from a sensor which measures the distance between the moving vehicle 1 and the obstacle OB during roundabout travel and keeps the distance measured constant, and these sensors are switched respectively, it is not required to switch sensitivity and turn the sensor as in the first embodiment. For example, sensors for measuring the distance between the moving vehicle 1 and the obstacle OB may be mounted on both sides of the moving vehicle 1.

The initial steering direction during roundabout travel is not limited to the left direction, and the steering direction may be decided in response to the status of the working operation or the setting of the traveling course, or on the basis that the steering should be made in a particular direction, i.e., either toward a side where the working operation has been completed or toward a side where the working operation has not yet been completed, and the like basis.

The present invention is not only applicable to a steering control system in which the position of the moving vehicle 1 is detected on the basis of positional information from reference points, whereby the moving vehicle is allowed to travel along a predetermined traveling course as in the first embodiment, but is also applicable to a steering control system for a moving vehicle wherein the moving vehicle is adapted to travel along a predetermined course established by means of aerial wires, leakage cables, electromagnetic cables, magnetic tapes or the like placed in the air, or on the ground or a floor. In the case where the present invention is applied to the latter control system, it may be so constructed that judgment for completing roundabout travel after the working operation was finished is effected on the basis of the detection signal of a detection sensor which is installed in the moving vehicle for detecting signals from these cables, tapes or the like, and the present steering control is restored to control travel of the moving vehicle along the predetermined traveling course based on the above described judgment.

According to the profile of the obstacle OB or the position of the obstacle OB with respect to the traveling course CL, there might be a case wherein the moving vehicle 1 goes around the obstacle OB, thereafter goes back towards the rearward direction with respect to the traveling course CL (the reverse direction of the arrow indicating the traveling course CL), and then enters into the traveling course CL. When the moving vehicle 1 begins to go in a rearward direction with respect to the traveling course CL as described above, it may be arranged that the roundabout travel of the moving vehicle 1 is modified to bring the vehicle back to the traveling course in a direction perpendicular thereto, i.e., to go back to the traveling course in the shortest distance. For instance, in a steering control system wherein the position of the moving vehicle 1 is detected on the basis of positional information of reference points thereby permitting the moving vehicle to travel on a predetermined traveling course CL, since a current position of the moving vehicle 1 can be detected in the direction of the predetermined course CL (FIG. 5) during the roundabout travel, it can be detected whether or not the moving vehicle 1 begins to go in a rearward direction along the traveling course by the provision of a means for detecting the polarity of changes of the current position in the direction of the traveling course CL.

The embodiment as described above is so constructed that when a moving vehicle has detected an obstacle on its traveling course, the moving vehicle goes around the obstacle while keeping the distance between the obstacle and the moving vehicle constant. Thus, even if the moving vehicle slips, the moving vehicle can go around the obstacle with an efficient roundabout traveling course in accordance with dimensions or size of the obstacle. In the first embodiment, the completion of the roundabout travel can be judged by a return detection signal from the return judging means 30, so that the moving vehicle can be returned correctly to the traveling course.

Figure 7:
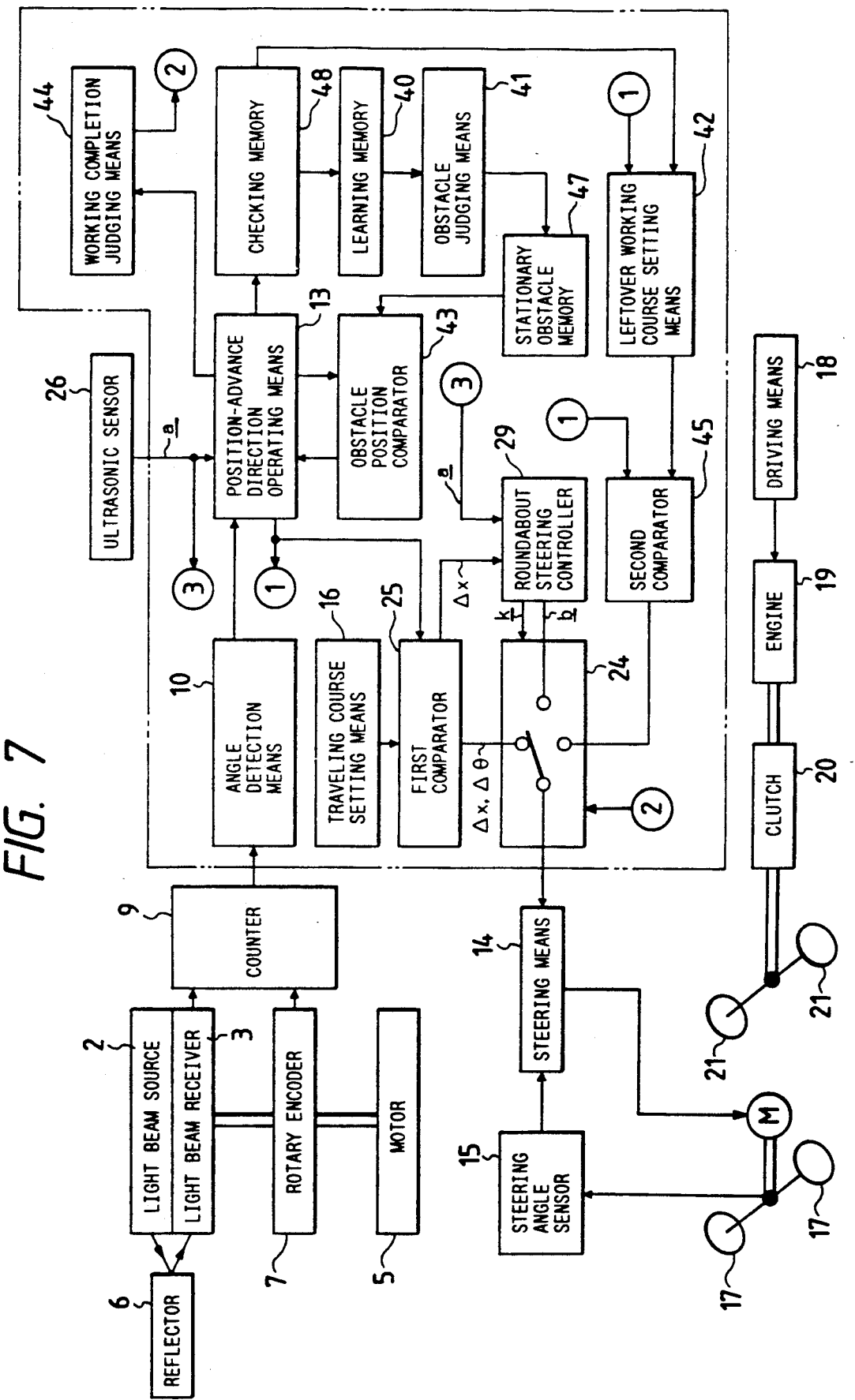
FIG. 7 is a block diagram illustrating a second embodiment of the present invention.

Referring now to FIG. 7, the second embodiment of the present invention will be described hereinbelow. In FIG. 7, the same or like reference characters designate corresponding or like parts of FIG. 1. It is substantially identical with the abovementioned first embodiment in that the light beam reflected from a reflector 6 is detected to calculate a present position of a moving vehicle 1 thereby allowing the moving vehicle to travel along a predetermined route, and in that the moving vehicle 1 is permitted to go around an obstacle on its route.

An obstacle detection signal a derived from an ultrasonic sensor 26 is input to a roundabout steering control means 29 and a position-advance direction operating means 13, respectively.

The roundabout steering control means 29 supplies a switching signal k to a switching means 24 in response to the signal a thereby to switch the switching means 24 to the side of the roundabout steering control means 29. When the switching means 24 was switched, a steering signal b for detouring an obstacle is supplied from the roundabout steering control means 29 to a steering means 14, whereby the above-mentioned roundabout travel is effected. In order to use later the extent and position of the place where working has not yet been completed due to the roundabout travel, the position of the moving vehicle 1 at the time when the roundabout travel is completed is stored in a memory means (not shown).

Furthermore, positional information of the moving vehicle 1 at the time when an obstacle was detected is supplied from the position-advance direction operating means 13 to an obstacle position comparing means 43 in response to the obstacle detection signal a. In the obstacle position comparing means 43, prior to commencing the working operation, positional information indicating positions of specified stationary obstacles such as trees and the like which has been previously input to a memory means 47 for stationary obstacles, is compared with the position of the moving vehicle 1 at the time when the obstacle was detected. It can be judged whether the obstacle detected is a stationary obstacle or not dependent upon the result of the comparison.

When the obstacle detected is not a stationary obstacle, the position of the moving vehicle 1 when the obstacle was detected is stored in a checking memory means 48. The contents in the checking memory means 48 are transferred to a learning memory means 40 when the obstacle is detected again during a recheck of the obstacle which will be described hereinafter.

In a stationary obstacle judging means 41, it is judged whether or not the positional information stored in the learning memory means 40 has been stored in the past. If the positional information has been detected in the past a predetermined number of times or more, the positional information which has been stored in the learning memory means 40 is stored in the stationary obstacle memory means 47 as additional stationary obstacle positional information.

In a leftover working course setting means 42, a traveling course for carrying out (for example, grass clipping) a working operation which has been left undone as a result of roundabout travel is set on the basis of the positional information stored in the checking memory means 48 as well as the positional information of the moving vehicle 1 at the time when the roundabout travel for an obstacle was completed. When there are a plurality of places in which the working has not yet been finished, a traveling course connecting the leftover places with each other is set.

In a second comparing means 45, the present positional information of the moving vehicle 1 supplied from the position-advance direction operating means 13 is compared with the traveling course for the leftover working operation supplied from the leftover working course setting means 42.

In a working completion judging means 44, it is judged whether or not the working operation has been completed based on the output from the position-advance direction operating means 13. When it is judged that the working operation is finished, the switching means 24 is switched to the side of the second comparing means 45 to supply the output from the second comparing means 45 to steering means 14, whereby steering control of the moving vehicle 1 is effected for the leftover grass clipping working operation.

In FIG. 7, the functions of the elements enclosed by a chain line may be effected by a microcomputer.

Next, the operation of the second embodiment of the present invention will be described hereinbelow. FIGS. 8 through 11 are flowcharts each illustrating the operation of the present embodiment and FIG. 12 is a view showing a layout of a traveling course for the moving vehicle 1 and reflectors 6.

Figure 12:
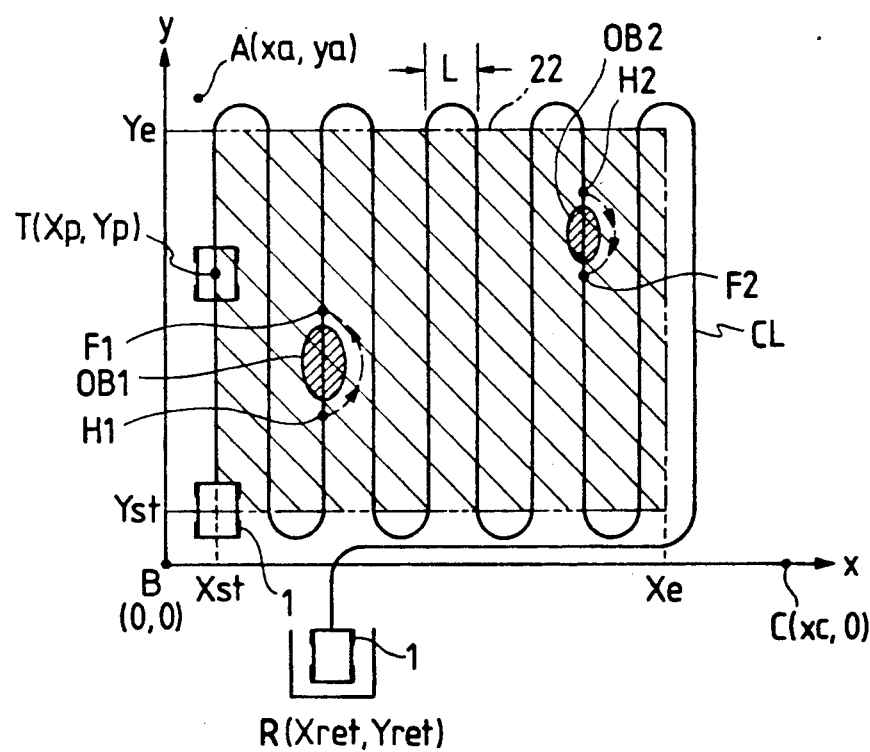
FIG. 12 is an explanatory view showing a traveling route of a moving vehicle.

In FIG. 12, the reflectors 6 are disposed at reference points A, B and C, and the moving vehicle 1 as well as a working zone 22 are represented by a coordinate system in which the reference point B is the origin and a line extending between the points B and C is the x-axis.

In FIG. 12, a point $R(X_{ret}, Y_{ret})$ indicates a return position of the moving vehicle, the working zone 22 corresponds to a region obtained by connecting four points represented by $(X_{st}, Y_{st})$, $(X_{st}, Y_e)$, $(X_e, Y_{st})$ and $(X_e, Y_e)$ with each other, and the position of the moving vehicle 1 is represented by a point $T(X_p, Y_p)$.

While the four sides of the working zone 22 have been made parallel to the x- or Y-axis, respectively, in order to simplify the explanation in FIG. 12, the shape of the working zone 22 and the directions of the four sides of the working zone 22 are arbitrary, so long as the reference points A, B and C are positioned around the working zone 22.

The moving vehicle 1 travels along a traveling course CL, and if there is an obstacle, the moving vehicle goes around the same and continues the working operation. In FIG. 12, a point H1 or H2 indicates a position where the moving vehicle 1 detects an obstacle OB1 or OB2 so that the vehicle starts to travel along the roundabout traveling course shown by a dotted line, while a point F1 or F2 indicates a position at which the moving vehicle completes the roundabout travel.

Figure 8B:
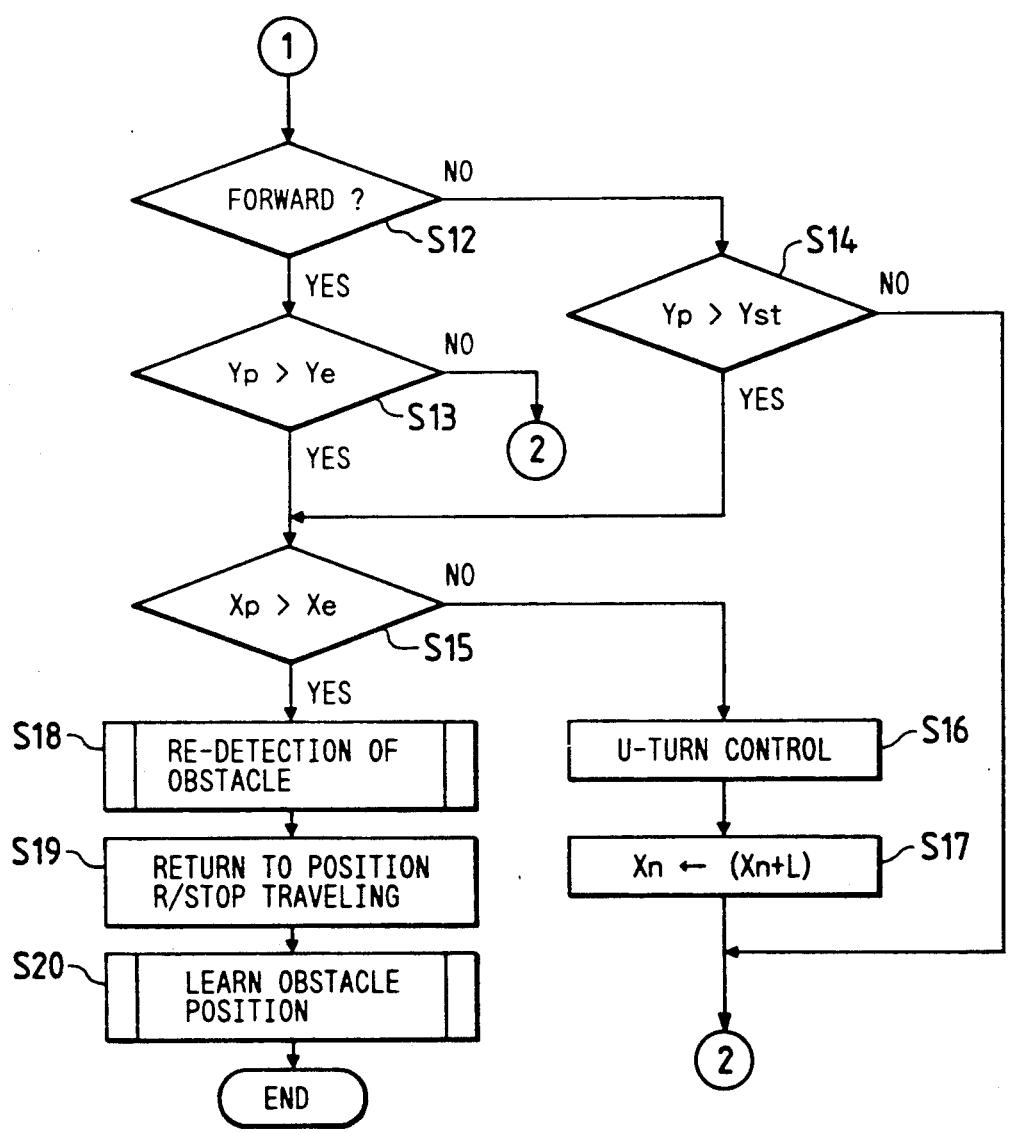

In accordance with the flowchart shown in FIG. 8, controlling procedures will be described hereinafter.

In step S1, positional information of stationary obstacles such as trees and the like is input to the stationary obstacle memory means 47. Such positional information of stationary obstacles can be detected, for example, by allowing the moving vehicle 1 to preliminarily travel along the traveling course CL prior to commencement of the working operation.

In step S2, the front wheels 17 of the vehicle are steered in accordance with a steering amount calculated on the basis of a present position R of the moving vehicle 1 and a coordinate $(X_{st}, Y_{st})$ of a working start position set in the traveling course setting means 16, so that the moving vehicle 1 is transferred to the working start position.

In step S3, $X_{st}$ is set as an x-coordinate $X_n$ of the traveling course.

The moving vehicle 1 starts its travel in step S4, and the current position $T(X_p, Y_p)$ and advance direction $\theta$ of the moving vehicle 1 are calculated in step S5. As to the procedures therefor, there is detailed description in U.S. patent application Ser. No. 07/344,574 (now U.S. Pat. No. 5,011,288) or Ser. No. 07/362,630 (now U.S. Pat. No. 4,947,324).

Figure 9:
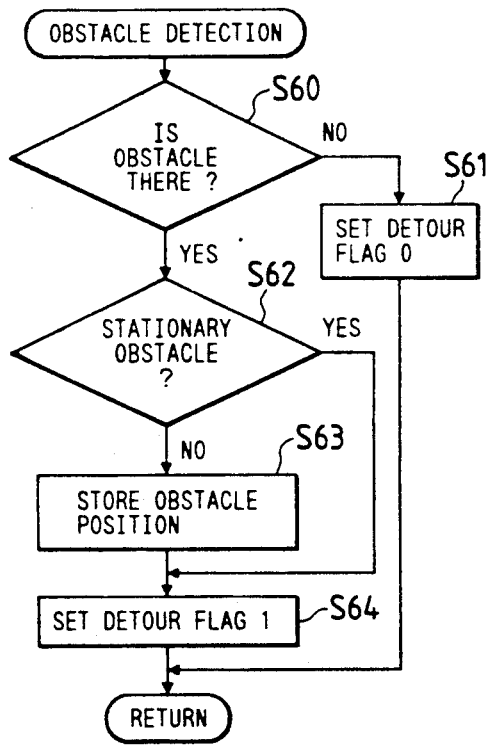

In step S6, an obstacle is checked in accordance with the procedures described in conjunction with FIG. 9 hereunder.

In step S7, a detour flag which is set in response to the result of checking the obstacle is discriminated. If the detour flag is "1", the procedure shifts to step S8 to effect roundabout travel for detouring the vehicle around the obstacle as mentioned above.

In step S9, the positions at which the moving vehicle 1 completed the roundabout travel, i.e., the above described points F1 and F2, are stored.

On the other hand, if the detour flag is "0" it is judged that there is no obstacle, and then the procedure proceeds to step S10.

A deviation amount from the traveling course ($\Delta x = Xp - Xn$, $\Delta\theta$) is calculated in step S10, and steering angle control is carried out in response to the deviation amount by the steering means 14 in step S11.

In step S12, it is judged whether the moving vehicle 1 is traveling in a direction going away from the origin in the Y-axis direction (forward direction) or whether it is traveling in a direction coming up to the origin (returning direction).

In the case of the forward direction, it is judged in step S13 whether one stroke was completed ($Yp > Ye$) or not, while in the returning direction, it is judged in step S14 whether one stroke was completed ($Yp > Yst$) or not. When it is judged that one stroke has not yet been finished in step S13 or S14, the procedures in steps S5–S14 are repeated.

When it is judged that one stroke has been finished in step S13 or S14, it is further judged whether or not all the strokes have been finished ($Xp > Xe$) in step S15.

If all the strokes have not yet been completed, a U-turn control of the moving vehicle 1 is carried out in step S16. The control for the U-turn (turning course) is effected in the manner, for example, described hereinbelow. The moving vehicle 1 is allowed to travel with the fixed steering angle which has been previously set, and the control for the turning course is completed when at least one azimuth among azimuths of the respective reference points A–C viewed from the moving vehicle 1, which azimuth is calculated on the basis of a differential azimuth detected by the angle detecting means 10, is in a predetermined angle range, thereby to steer the moving vehicle back into a straight line course.

In step S17, ($Xn + L$) is set to Xn, and as a result, the next traveling course is set.

When all strokes are completed, an obstacle is rechecked in step S18 in accordance with the procedures which will be described in connection with FIG. 10. When the recheck of an obstacle is finished, the moving vehicle returns to a return position R to stop the travel in step S19, and in step S20, a position of the obstacle is learned in accordance with the procedures which will be described hereunder in conjunction with FIG. 11.

Next, the operation for checking an obstacle in step S6 will be described by referring to FIG. 9. In FIG. 9, it is judged in step S60 whether or not there is an obstacle in the path of the moving vehicle 1 based on the output from the ultrasonic sensor 26. When there is no obstacle, the procedure shifts to step S61 in which "0" is set to the detour flag and the processing is completed.

When an obstacle was detected, the procedure proceeds to step S62, and it is judged whether or not the obstacle detected is one which has been previously stored in the stationary obstacle memory means 47. When the obstacle coincides with that stored in the memory means 47, the procedure jumps to step S64 to set "1" in the detour flag, and then the processing completes. When the obstacle detected is not one which has been stored in the memory means 47, the procedure proceeds to step S63 and positional information of the obstacle is stored in the checking memory means 48.

In step S64, "1" is set in the detour flag.

As described above, in the obstacle checking routine, when an obstacle was detected, a detour flag which indicates that roundabout travel is required for the moving vehicle 1 is established, and at the same time positional information of the obstacle is stored in the checking memory means 48 for a leftover working operation to be done later if the obstacle has not previously been stored as a stationary obstacle.

The operation for rechecking an obstacle will be described hereinbelow by referring to FIG. 10. It is detected in step S180 whether a check of an obstacle is required or not, more specifically, it is detected whether or not the positional information of an obstacle(s) has been stored in the checking memory means 48. When the obstacle is not one whose positional information has been stored in the checking memory means 48, the processing is completed.

Where the obstacle is one whose positional information has been stored in the checking memory means 48, the procedure shifts to step S181, a leftover working course is established in a leftover working course setting means 42 on the basis of the previously stored positional information of the obstacle, and the moving vehicle 1 is transferred along the course determined in step S182.

In step S183, it is determined whether or not the obstacle was detected again. When the obstacle is not detected this time at the position which has been previously stored, the procedure proceeds to step S184 as a result of a judgment that the obstacle has been moved to another place.

In step S184, since the obstacle which had been stored in the checking memory means 48 was not a stationary one, the stored contents are erased.

In step S185, a working operation is done in the leftover working place in which the working operation has not yet been completed. When the working operation is completed in the unfinished working place, it is judged in step S186 whether there is another obstacle to be rechecked or not, and if not the processing is completed. When there is another obstacle, the procedure returns to step S182, and then the moving vehicle 1 is allowed to transfer to the next unfinished working place.

When the judgment in step S183 is YES, in other words, an obstacle previously detected during the working operation is still present in the same position, there is a possibility that said obstacle is a stationary obstacle, so that the procedure proceeds to step S187 and the position is stored in the learning memory means 40.

As described above, in rechecking of the obstacle, it is checked whether or not the obstacle which had been detected during the working operation is still present in the same position, and as a result, when the obstacle is not present in the same position, the working operation is carried out in that place (i.e. the unfinished working place).

The process for learning the position of an obstacle (step S20) will be described hereinbelow by referring to FIG. 11.

Figure 11:
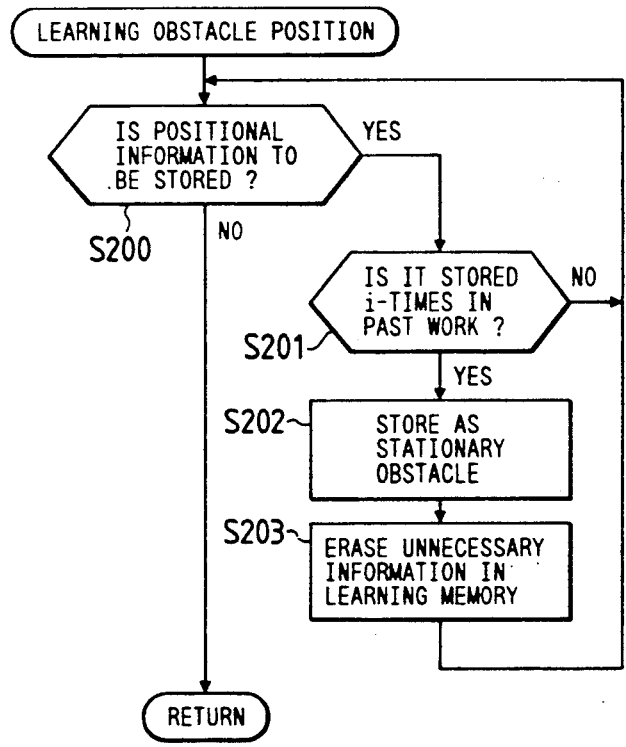

In FIG. 11 it is judged in step S200 whether or not positional information of an obstacle has been stored in the learning memory means 40. If nothing is stored, the processing is completed, while in the case where positional information is to be stored, the procedure shifts to step S201.

In step S201, it is judged whether or not the position to be stored in the learning memory means 40 this time is one which had been continuously stored in the learning memory means 40 a predetermined number of times i during a series of past working operations. Number of times 1-2 is suitable for the predetermined number of times i.

When the judgment in the step S201 is YES, it is concluded that the obstacle is stationarily present at that place all the time, so that in step S202, the resulting positional information is stored in the stationary obstacle memory means 47 in addition to the positional information which has been previously stored.

In step S203, the positional information stored in the stationary obstacle memory means 47 in step S202 is erased from the learning memory means 40.

In the step S201, when the result is NO, the procedure skips over steps S202 and S203.

As described above, in learning of an obstacle, the position of a stationary obstacle which is detected all the time is adapted to be stored in the stationary obstacle memory means 47. As a result, only obstacles which have not been judged to be stationary obstacles are rechecked and a stationary obstacle need not be rechecked during the rechecking of obstacles. Thus, useless rechecking of obstacles can be avoided.

According to the second embodiment of the present invention, when an obstacle OB is detected on a traveling course, the moving vehicle 1 goes around the obstacle to continue the working operation. After completing the usual working operation, the moving vehicle 1 may be allowed to return to positions where obstacles other than those which have been previously stored as stationary obstacles as well as those registered as a result of learning processing among the obstacles detected as described above were detected, and then the presence of the obstacle can be rechecked. As a result of the recheck, when the obstacle is not detected, the leftover working operation can be carried out at that place.

The rechecking after completing the usual working operation is not necessarily effected immediately after the working operation, e.g., the recheck after completion of the working operation can be deferred for a predetermined period of time sufficient to permit removal of an obstacle by someone.

It is desirable that a traveling course (leftover working course) for the above described recheck is so calculated that a distance of the course connecting respective points at which obstacles were detected becomes the shortest and the resulting course is set accordingly at the time when the usual working was completed. Of course, a course extending up to the point at which the next obstacle was detected may be calculated at the time when one obstacle is rechecked.

In the second embodiment, positional information of an obstacle which had been judged to be a stationary obstacle as a result of learning is additionally registered in the stationary obstacle memory means in which such obstacle has been previously registered as a stationary obstacle. Alternatively, a memory means in which information of stationary obstacles have previously been registered may be separately provided from a memory means in which information is registered regarding an obstacle that is concluded newly to be stationary as a result of learning. For instance, an external memory such as an IC card may be used as a memory means in which information as to stationary obstacles have previously been registered, while a memory means for registering information obtained as a result of learning may be an internal memory. When it is arranged that the positional information of stationary obstacles derived from both of the memory means is stored in the external memory after completing the working operation, the working operation can be carried out in every working zones by the use of the external memories.

While maximal advantages can be obtained by providing a means for previously registering information as to obstacles and affording learning functions as described in the second embodiment, if there is at least a function for rechecking all the obstacles which were detected during the working operation, better advantages than those of the prior art and the first embodiment can be attained even if these are not the above described means and the learning functions as in the second embodiment.

According to the second embodiment of the present invention, the following advantages are obtained.

(1) Unfinished working places can be reduced, because it is judged whether or not an obstacle is present at the same place that an obstacle was previously present after completing the usual working operation in respect to an obstacle which had been gone around by the moving vehicle, it is also judged whether an obstacle on a traveling course is stationary, and the unfinished working place can then be automatically processed for a leftover working operation.

(2) Since a detour travel operation and a return travel operation to the position of the detour operation are automatically carried by the moving vehicle, an operator's manual operation is not required to operate the moving vehicle so that its working efficiency increases.

(3) It is not required that an operator remove any obstacle prior to effecting a working operation with the moving vehicle, but he may remove or move such obstacles during a working operation in a particular zone or during movement of the vehicle with respect to other working zones. As a result, an operator has adequate time to perform a supervisory function during working operation of the moving vehicle.

The present invention is not limited to use of the illustrated moving vehicle for grass clipping, and increased efficiencies can be achieved when the invention is applied to, for example, a moving vehicle for collecting balls on a golf course by tracing the ground, or for collecting dust, or for water sprinkling or applying manure and the like.

What is claimed is:

1. A steering control system for a moving vehicle provided with means for detecting the present position and advance direction of the moving vehicle with respect to reference points disposed at several locations in and around a region in which a predetermined working operation is to be conducted by said vehicle, and a steering control means which controls the steering of the moving vehicle to cause said vehicle to travel along a predetermined traveling course in said region on the basis of information detected by said detecting means as well as information that defines said traveling course, comprising:

an obstacle sensor installed on said moving vehicle for detecting presence of an obstacle in an uncontacted manner;

roundabout steering control means responsive to a signal from said sensor for causing said vehicle to detour around said obstacle while maintaining the distance between said obstacle and the moving vehicle at a predetermined value;

switching means for selecting said roundabout steering control means to control the steering of said vehicle when said sensor detects the presence of an obstacle on said predetermined traveling course, said switching means being operative thereafter to select said steering control means for controlling the steering of said vehicle along said predetermined traveling course after said vehicle completes its said detour around said obstacle under the control of said roundabout steering control means; and means for stopping the moving vehicle in response to an obstacle detection signal from said sensor, said switching means being responsive to an output of a timer which detects a continuance of the obstacle detection signal for at least a predetermined period of time.

2. A steering control means for the moving vehicle as claimed in claim 1 comprising a means for resuming the travel of the moving vehicle when said obstacle detection signal disappears before said predetermined period of time elapses.

3. A steering control system for a moving vehicle wherein a light beam emitted from the moving vehicle is scanned around an axis on the moving vehicle along the circumferential direction thereof, and the light beam is reflected by light-reflecting means disposed at several points around a region in which a predetermined working operation is to be conducted by said vehicle as said vehicle moves along a predetermined traveling course in said region, the reflected light being received at said axis on the vehicle to detect the position of the moving vehicle in said region, said system comprising:

azimuth detection means for detecting the azimuths of the respective light-reflecting means with respect to an advance direction of the moving vehicle on the basis of a beam receiving interval of the light reflected by said light-reflecting means;

position calculation means for calculating the current position of the moving vehicle in said region based on the detected azimuths;

normal steering control means for normally controlling the steering of said vehicle so as to cause said moving vehicle to travel along said predetermined traveling course on the basis of the calculated current position of the vehicle as well as on the basis of information that defines said predetermined traveling course;

an obstacle sensor installed on said moving vehicle for detecting an obstacle on said predetermined traveling course in an uncontacted manner;

roundabout steering control means for causing said moving vehicle to leave said predetermined traveling course and to detour around said obstacle in response to an obstacle detection signal from said sensor; and switching means for selecting said roundabout steering control means to control the steering of said vehicle when an obstacle is detected on said predetermined traveling cause by said obstacle sensor, said switching means being operative subsequently to select said normal steering control means for controlling steering of said vehicle along said predetermined traveling course after said vehicle completes said detour around said obstacle;

said position calculation means being kept in operation during the time said roundabout steering control means is operative to control the steering of said vehicle, completion of said detour being determined by an output of said position calculation means indicating that the then current position of the moving vehicle is on said predetermined traveling course along which said vehicle was traveling just before said roundabout steering control means was selected.

4. A steering control system for a moving vehicle as claimed in claim 3 further including:

memory means for storing the position of an obstacle detected by said obstacle sensor;

means for transferring said moving vehicle to said stored position after said vehicle has detoured around said obstacle and completed said predetermined working operation; and control means operative after completion of said predetermined working operation for determining whether or not said obstacle has been removed from said stored position and, when it is determined that said obstacle has been removed, operative to cause said vehicle to perform said predetermined working operation in the portion of said region wherein said working operation was not previously performed because of the detour of said vehicle around said obstacle.

5. A steering control means for a moving vehicle as claimed in claim 4 further comprising a stationary obstacle memory means for storing positions of stationary obstacles, and means for determining whether or not an obstacle detected during a working operation is one of the stationary obstacles the positions of which have been stored in said stationary obstacle memory means, said control means being operative to return said moving vehicle to the position at which the presence of said obstacle was detected after completing said predetermined working operation in only the case where the obstacle detected is not a stationary obstacle.

6. A steering control means for a moving vehicle as claimed in claim 5 comprising means for detecting whether the obstacle which has been detected by means of said obstacle sensor and whose position has been stored in said memory means is the same obstacle which had been detected and stored in a previous working operation, and means for storing the position of a particular obstacle in said stationary obstacle memory means when the number of times said particular obstacle had been continuously detected and stored in a series of previous working operations is equal to or more than a predetermined value.

7. A steering control means for a moving vehicle as claimed in claim 4 comprising means for calculating a traveling course for transferring the moving vehicle to a position where the obstacle was detected on the basis of the position of the obstacle which was detected by means of the obstacle sensor and stored in said memory means as well as a present position of the moving vehicle.

8. A steering control means for a moving vehicle as claimed in claim 4 wherein the working operation of said moving vehicle is to collect objects scattered on the ground.

9. A steering control means for the moving vehicle as claimed in claim 4 wherein the working operation of said moving vehicle is grass clipping.

* * * * *